(12) United States Patent
Song et al.

(10) Patent No.: US 12,700,076 B2
(45) Date of Patent: Aug. 4, 2026

(54) IMAGE QUALITY ASSESSMENT METHOD, AND ELECTRONIC DEVICE AND COMPUTER-READABLE STORAGE MEDIUM

(71) Applicant: UBTECH ROBOTICS CORP LTD, Shenzhen (CN)

(72) Inventors: Xilai Song, Shenzhen (CN); Pei Dong, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 231 days.

(21) Appl. No.: 18/805,567

(22) Filed: Aug. 15, 2024

(65) Prior Publication Data

US 2025/0124557 A1 Apr. 17, 2025

(30) Foreign Application Priority Data

Oct. 16, 2023 (CN) .......................... 202311337163.4

(51) Int. Cl.
*G06T 7/00* (2017.01)
*G06T 5/40* (2006.01)
(52) U.S. Cl.
CPC .............. *G06T 7/0002* (2013.01); *G06T 5/40* (2013.01); *G06T 2207/30168* (2013.01)

(58) Field of Classification Search
CPC ..................... G06T 7/0002; G06T 5/40; G06T 2207/30168
See application file for complete search history.

(56) References Cited

FOREIGN PATENT DOCUMENTS

| CN | 114066783 A | * | 11/2021 | ............... | G06T 5/40 |
| KR | 20210083263 A | * | 1/2023 | ............... | G06T 7/11 |

* cited by examiner

*Primary Examiner* — David F Dunphy

(57) ABSTRACT

An image quality assessing method, an electronic device, and a computer-readable storage medium are provided. The method includes: obtaining a to-be-assessed original image; obtaining a grayscale image and a histogram equalization image corresponding to the obtained original image by performing an image conversion on the original image; calculating an image similarity between the obtained grayscale image and the obtained histogram equalization image; and determining an image quality assessment result of the original image according to the calculated image similarity. Through the forgoing method, the original image can be converted to obtain the corresponding grayscale image and histogram equalization image, and the image quality assessment result of the original image can be determined according to the image similarity between the grayscale image and the histogram equalization image, which does not involve statistics and calculations of multiple feature indicators, and is helpful to improve the efficiency of the image quality assessment method.

20 Claims, 5 Drawing Sheets

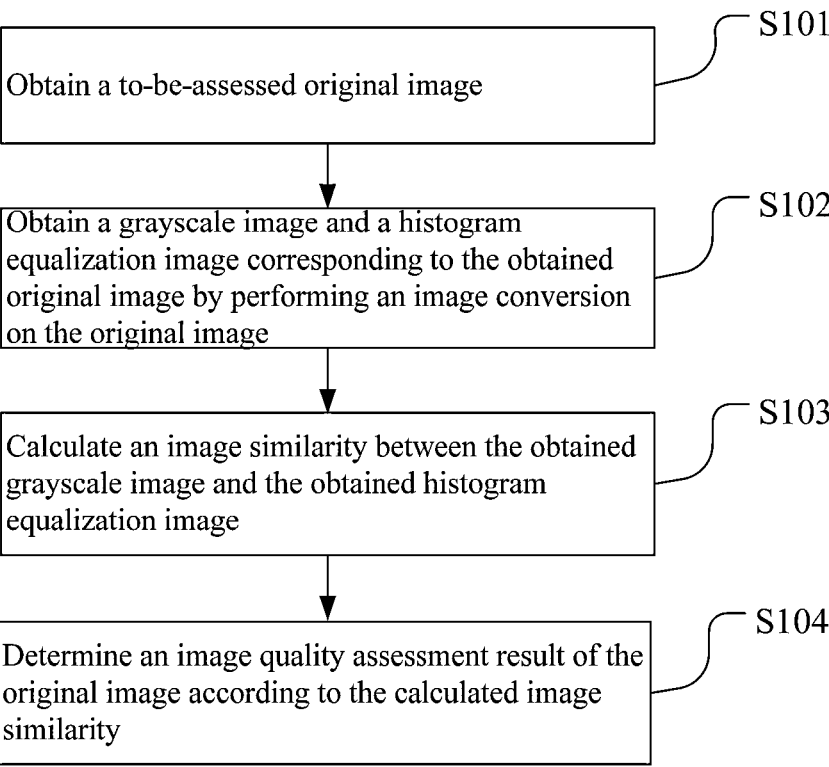

Obtain a to-be-assessed original image — S101

Obtain a grayscale image and a histogram equalization image corresponding to the obtained original image by performing an image conversion on the original image — S102

Calculate an image similarity between the obtained grayscale image and the obtained histogram equalization image — S103

Determine an image quality assessment result of the original image according to the calculated image similarity — S104

FIG. 1

Original Image 1
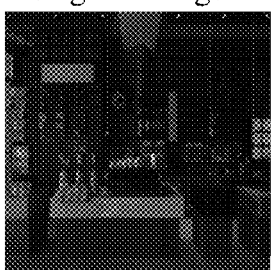
Grayscale Image 1
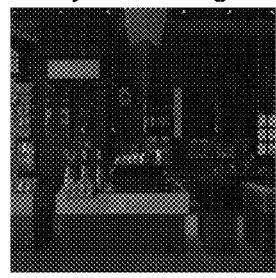
Histogram
Equalization Image
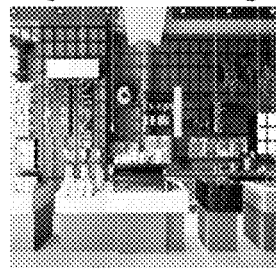
Original Image 2
Grayscale Image 2
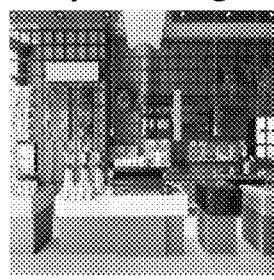
Histogram
Equalization Image 2
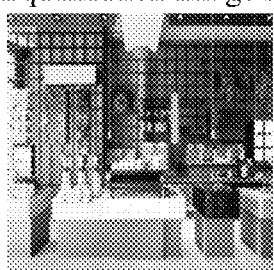
Original Image 3
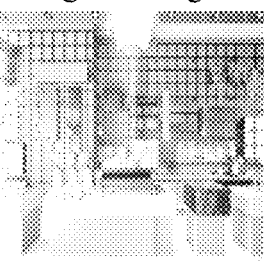
Grayscale Image 3
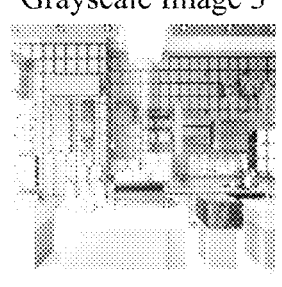
Histogram
Equalization Image 3
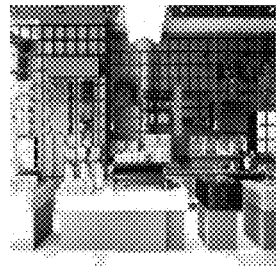
FIG. 2

IMAGE QUALITY ASSESSMENT METHOD, AND ELECTRONIC DEVICE AND COMPUTER-READABLE STORAGE MEDIUM

CROSS REFERENCE TO RELATED APPLICATIONS

The present disclosure claims priority to Chinese Patent Application No. 202311337163.4, filed Oct. 16, 2023, which is hereby incorporated by reference herein as if set forth in its entirety.

TECHNICAL FIELD

The present disclosure relates to image processing technology, and particularly to an image quality assessing method, an electronic device, and a computer-readable storage medium.

BACKGROUND

Image quality is an important factor affecting the performance of visual algorithms. In the fields of image processing technology and computer vision, image quality assessment is widely used. However, most of the existing image quality assessment methods require statistics of various feature indicators to comprehensively evaluate the quality of images, resulting in low efficiency of the image quality assessment methods.

BRIEF DESCRIPTION OF DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

FIG. 1 is a flow chart of an image quality assessment method according to an embodiment of the present disclosure.

FIG. 2 is a schematic diagram of the images at different exposure levels according to an embodiment of the present disclosure.

DETAILED DESCRIPTION

Figure 3:
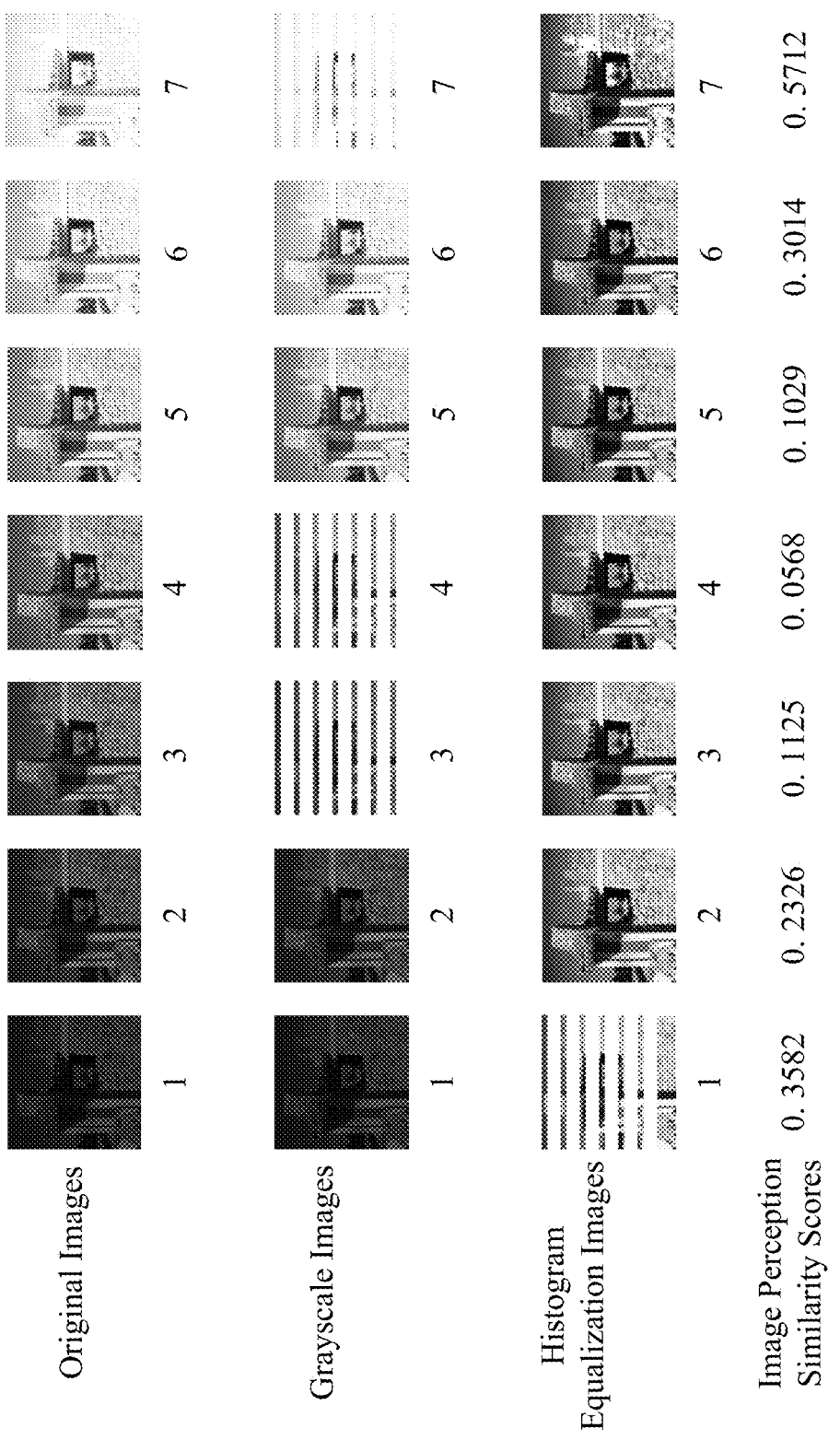
FIG. 3 is a schematic diagram of the images at different exposure levels according to another embodiment of the present disclosure.

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "a," "an," and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the present disclosure, the terms "first", "second", "third", and the like in the descriptions are only used for distinguishing, and cannot be understood as indicating or implying relative importance.

The embodiments of the present disclosure provide an image quality assessing method, an electronic device, and a computer-readable storage medium to solve the low efficiency problem of the existing image quality assessment method.

It should be noted that the execution entity of the methods in the present disclosure is a terminal device such as an electronic device, specifically, it may include but is not limited to desktop computer, notebook, pocket computer, and other common existing computing device.

FIG. 1 is a flow chart of an image quality assessment method according to an embodiment of the present disclosure. A method for assessing the quality of images may be applied on (a processor of) an apparatus for assessing the quality of images shown in FIG. 4. In other embodiments, the method may be implemented through a terminal device shown in FIG. 5. As shown in FIG. 1, in this embodiment, the image quality assessment method may include the following steps.

S101: obtaining a to-be-assessed original image.

In this embodiment, the original image to be assessed for its image quality may be obtained, and the method for obtaining the original image may be set according to actual needs.

In an example of this embodiment, a default image obtaining device may be used to obtain the original image to be assessed.

As an example, the image obtaining device may be a pre-installed camera on the terminal device. The terminal device may send an image obtaining instruction to the image obtaining device, and the image obtaining device may collect images in real time in response to the image obtaining instruction so as to obtain the original image to be assessed.

As another example, the collected original image to be assessed may be stored in a preset storage module, and the original image to be assessed may be obtained from the storage module later when the image quality of the original image needs to be assessed.

In another example of this embodiment, it may obtain the to-be-assessed original image from other computing device.

For example, the terminal device may be a smart phone that may establish a communication connection with the pre-installed camera to receive the image sent by the camera that may be used as the original image.

For another example, the terminal device may be a notebook that may receive the image sent by a default server, and the received image may be used as the original image.

S102: obtaining a grayscale image and a histogram equalization image corresponding to the obtained original image by performing an image conversion on the original image.

In this embodiment, it may obtain the grayscale image corresponding to the original image by performing a grayscale processing on the original image, where the grayscale processing method may be set according to needs.

In an example of this embodiment, for a certain pixel in the original image that is an RGB image, the brightness of one of the three components (i.e., R, G, and B) of the pixel may be used as the grayscale of its corresponding pixel in the grayscale image. For example, the brightness of the R component of a certain pixel in the original image may be used as the grayscale of its corresponding pixel in the grayscale image.

In another example of this embodiment, for a certain pixel in the original image, the maximum one among the brightness of the three components of the pixel may be used as the grayscale of its corresponding pixel in the grayscale image. For example, if the maximum one among the brightness of the three components of a certain pixel in the original image is the brightness of B component, the brightness of B component may be used as the grayscale of its corresponding pixel in the grayscale image.

In still another example of this embodiment, for a certain pixel in the original image, the minimum one among the brightness of the three components of the pixel may be used as the grayscale of its corresponding pixel in the grayscale image. For example, if the minimum one among the brightness of the three components of a certain pixel in the original image is the brightness of G component, the brightness of G component may be used as the grayscale of its corresponding pixel in the grayscale image.

In the other example of this embodiment, for a certain pixel in the original image, the average value of the brightness of the three components of the pixel may be used as the grayscale of its corresponding pixel in the grayscale image.

In the other example of this embodiment, for a certain pixel in the original image, the brightness of the three components of the pixel may be weighted averaged according to a preset weighting coefficient, and the weighted averaged brightness may be used as the grayscale of its corresponding pixel in the grayscale image.

In this embodiment, it may further obtain the histogram equalization image corresponding to the original image by performing a histogram equalization processing on the grayscale image. When performing the histogram equalization processing, the grayscales with a larger number of pixels in the grayscale image (i.e., the grayscales that play a major role in the image screen) are widened, and the grayscales with a smaller number of pixels (i.e., the grayscales that do not play a major role in the image screen) are merged, thereby increasing the contrast of the image to make the overly dark or overexposed image clearer. The specific histogram equalization algorithm used may be specific and situationally set according to actual needs.

In an example of this embodiment, it may perform the histogram equalization processing on the grayscale image using the traditional histogram equalization algorithm. Specifically, the number of pixels at each grayscale level in the grayscale image may be calculated, and the number of pixels at all the grayscale levels before each grayscale level may be accumulated. Then, the histogram equalization image may be obtained by mapping the pixels in each grayscale level onto a new grayscale level according to a preset mapping rule. In which, the mapping rule may be specifically set according to actual conditions.

In another example of this embodiment, an adaptive histogram equalization (AHE) algorithm may be used to perform the histogram equalization processing on the grayscale image so as to retain more partial details of the grayscale image and avoid excessive enhancing noises. Specifically, the grayscale image may be divided into a plurality of parts, and each part may be histogram equalized to covers a preset new grayscale range. Then, the equalization result of each part may be interpolated or spliced to reconstruct the histogram equalization image.

In still another example of this embodiment, a contrast limited adaptive histogram equalization (CLAHE) algorithm may be used to perform the histogram equalization processing on the grayscale image so as to enhance the details of the grayscale image while controlling the enhancing noises. Specifically, the grayscale image may be divided into a plurality of parts, and each part may be histogram equalized to covers a preset new grayscale range. Then, the pixel values of each part may be limited to limit the contrast of the area. Eventually, the equalization result of each part may be interpolated or spliced to reconstruct the histogram equalization image.

S103: calculating an image similarity between the obtained grayscale image and the obtained histogram equalization image.

In this embodiment, it may calculate the image similarity between the grayscale image and the histogram equalization image using any existing image similarity calculation method that includes but not limited to learned perceptual image patch similarity (LPIPS), mean squared error (MSE), structural similarity index (SSIM), peak signal-to-noise ratio (PSNR), mutual information (MI), and other existing common image similarity calculation method.

For ease of description, the subsequent process will be illustrated by an example that uses the image perception similarity score as the image similarity.

It should be noted that the LPIPS algorithm may evaluate the difference between images based on perceptual loss by simulating human perception, and its image similarity is [0,1]. In the LPIPS algorithm, the lower the image perception similarity score of two images, the similar the two images are; otherwise, the less similar the two images are.

Here, the image perception similarity score between the grayscale image and the histogram equalization image may be calculated to use as the image similarity between the grayscale image and the histogram equalization image.

S104: determining an image quality assessment result of the original image according to the calculated image similarity.

It should be understood that if the original image is a normally exposed image, the grayscale image and the histogram equalization image corresponding to the original image will be relatively similar to each other; otherwise, if the original image is an overly dark or overexposed image, the grayscale image and the histogram equalization image corresponding to the original image will be different from each other in more obvious manner. FIG. 2 is a schematic diagram of the images at different exposure levels according to an embodiment of the present disclosure. As shown in FIG. 2, the original image 1 is an overly dark image, and its corresponding grayscale image (grayscale image 1) and histogram equalization image (histogram equalization image 1) have obvious differences with each other; original image 3 is an overexposed image, and its corresponding grayscale image (grayscale image 3) and histogram equalization image (histogram equalization image 3) also have obvious differences with each other; and original image 2 is a normally exposed image, and its corresponding grayscale image (grayscale image 2) and histogram equalization image (histogram equalization image 2) are relatively similar to each other.

Therefore, in this embodiment, the image quality assessment result of the original image may be determined according to the image similarity between the grayscale image and the histogram equalization image. If the image similarity between the grayscale image and the histogram equalization image that correspond to the original image is large, it may indicate that the exposure level of the original image is relatively normal. FIG. 3 is a schematic diagram of the images at different exposure levels according to another embodiment of the present disclosure. As shown in FIG. 3, the image perception similarity score between grayscale image 4 and histogram equalization image 4 that correspond to original image 4 is the smallest (specifically 0.0568), indicating that grayscale image 4 and histogram equalization image 4 are the most similar, and the exposure level of original image 4 is also the most normal among original images 1-7.

In an example of this embodiment, it may calculate a difference between a preset maximum similarity and the image similarity, and may obtain the image quality score of the original image by normalizing the difference to a preset image quality score interval. Then, the image quality assessment result of the original image may be obtained by performing image quality assessment according to the image quality score.

In the forgoing example, it may determine a score level interval in which the image quality score is located, and determine an image quality level corresponding to the score level interval as the image quality level of the original image. For example, the image perception similarity score between the grayscale image and the histogram equalization image may be used as the image similarity, and the image perception similarity score is [0,1], that is, the maximum similarity is 1. Therefore, the difference between 1 and the image perception similarity score may be calculated, and the difference may be normalized to the preset image quality score interval. As an example, the difference may be magnified 100 times to take an integer, so that the difference may be normalized to [0,100] so as to obtain the image quality score of the original image. If the image quality score is in the scoring level interval of [0,80], it may indicate that the original image is severely too dark or overexposed; if the image quality score is in the scoring level interval of (80,90), it may indicate that the original image is slightly too dark or overexposed; and if the image quality score is in the scoring level interval of [90,100], it may indicate that the original image is a normal image.

In the forgoing example, the image quality assessment result of the original image may also be determined according to the image quality score and a preset image quality score threshold. Specifically, it may determine the original image to be a normal image, in response to the image quality score being larger than a preset image quality score threshold, and may determine the original image to be a distorted image, in response to the image quality score being less than or equal to the image quality score threshold.

In another example of this embodiment, the image similarity may be used as the image quality score to determine the image quality assessment result of the original image according to the image quality score. Specifically, the image quality assessment result of the original image may be determined according to the image similarity and a preset image similarity threshold. If the image similarity is less than the image similarity threshold, it determines the original image to be a normal image; if the image similarity is larger than or equal to the image similarity threshold, it determines the original image to be a distorted image; or the image quality assessment result of the original image may also be determined according to the preset image similarity interval in which the image similarity is located.

In still another example of this embodiment, the difference between the preset maximum similarity and the image similarity may be used as the image quality score to determine the image quality assessment result of the original image according to the image quality score. Specifically, if the difference is larger than an image difference threshold, it may determine the original image to be a normal image; if the difference is less than or equal to the image difference threshold, it may determine the original image to be a distorted image; or the image quality assessment result of the original image may also be determined according to a preset image difference interval in which the difference is located.

The specific values of each threshold and interval in the above-mentioned process of image quality assessment may be set according to actual needs. For example, different thresholds and intervals may be set in different application scenarios to improve the scene adaptability of the image quality assessment result.

In summary, in this embodiment, it obtains a to-be-assessed original image; obtains a grayscale image and a histogram equalization image corresponding to the obtained original image by performing an image conversion on the original image; calculates an image similarity between the obtained grayscale image and the obtained histogram equalization image; and determines an image quality assessment result of the original image according to the calculated image similarity. Through this embodiment, the original image can be converted to obtain the corresponding grayscale image and histogram equalization image, and the image quality assessment result of the original image can be determined according to the image similarity between the grayscale image and the histogram equalization image, which does not involve statistics and calculations of multiple feature indicators, and is helpful to improve the efficiency of the image quality assessment method.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 4:
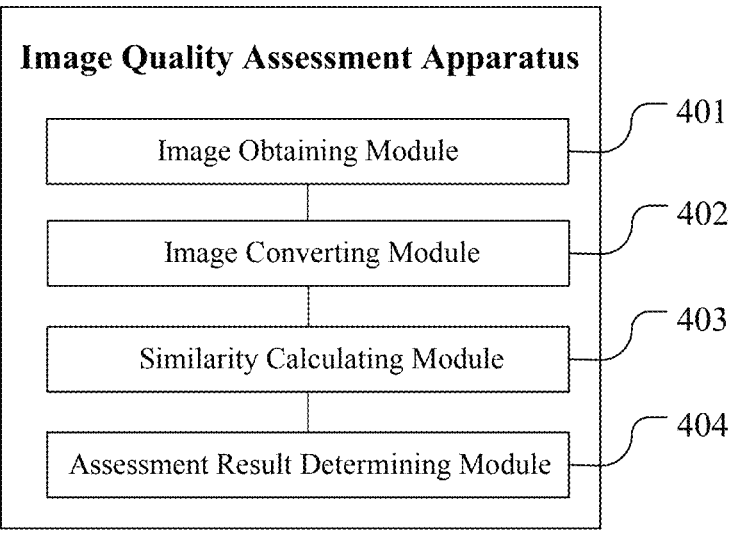
FIG. 4 is a schematic diagram of an image quality assessment apparatus according to an embodiment of the present disclosure.

The embodiments of the present disclosure further provide an image quality assessment apparatus corresponding to the image quality assessing method described in the above-mentioned embodiment. FIG. 4 is a schematic diagram of an image quality assessment apparatus according to an embodiment of the present disclosure. As shown in FIG. 4, in this embodiment, the image quality assessment apparatus (e.g., an electronic device) may include:

an image obtaining module 401 configured to obtain a to-be-assessed original image;

an image converting module 402 configured to obtain a grayscale image and a histogram equalization image corresponding to the obtained original image by performing an image conversion on the original image;

a similarity calculating module 403 configured to calculate an image similarity between the obtained grayscale image and the obtained histogram equalization image; and an assessment result determining module 404 configured to determine an image quality assessment result of the original image according to the calculated image similarity.

In an example of this embodiment, the image converting module 402 may include:

a grayscale processing submodule configured to obtain the grayscale image corresponding to the original image by performing a grayscale processing on the original image;

an equalization processing submodule configured to obtain the histogram equalization image corresponding to the original image by performing a histogram equalization processing on the grayscale image.

In an example of this embodiment, the similarity calculating module 403 may include:

a quality score calculating submodule configured to calculate an image quality score of the original image according to the image similarity; and an assessment result determining submodule configured to determine the image quality assessment result of the original image according to the image quality score.

In an example of this embodiment, the quality score calculating may include:

a difference calculating unit configured to calculate a difference between a preset maximum similarity and the image similarity; and a normalization unit configured to obtain the image quality score of the original image by normalizing the difference to a preset image quality score interval.

In an example of this embodiment, the assessment result determining submodule may include:

a normal image determining unit configured to determine the original image to be a normal image, in response to the image quality score being larger than a preset image quality score threshold; and a distorted image determining unit configured to determine the original image to be a distorted image, in response to the image quality score being less than or equal to the image quality score threshold.

In an example of this embodiment, the assessment result determining submodule may include:

a level interval determining unit configured to determine a score level interval in which the image quality score is located; and a quality level determining unit configured to determine an image quality level corresponding to the score level interval as the image quality level of the original image.

In an example of this embodiment, the assessment result determining submodule may include:

a normal image determining submodule configured to determine the original image to be a normal image, in response to the image similarity being less than a preset image similarity threshold; and a distorted image determining submodule configured to determine the original image to be a distorted image, in response to the image similarity being larger than or equal to the image similarity threshold.

Those skilled in the art may clearly understand that, for the convenience and simplicity of description, for the specific operation process of the apparatus, modules, and units, reference may be made to the corresponding processes in the above-mentioned method embodiments, and are not described herein.

Figure 5:
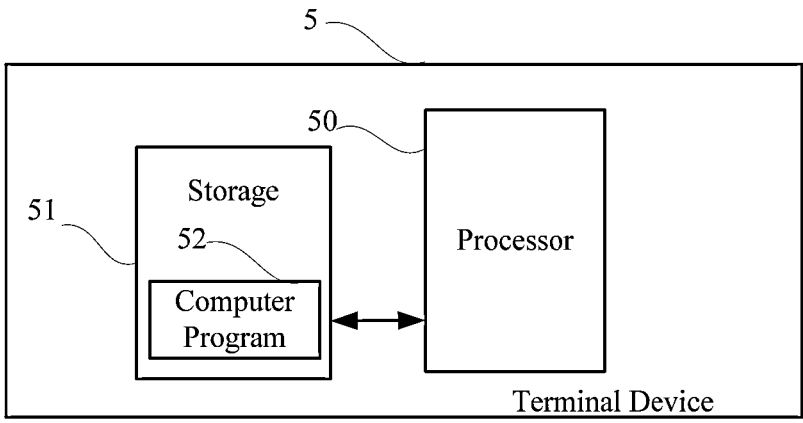
FIG. 5 is a schematic diagram of a terminal device according to an embodiment of the present disclosure.

FIG. 5 is a schematic diagram of a terminal device according to an embodiment of the present disclosure. For the convenience of explanation, only the part related to this embodiment is shown.

As shown in FIG. 5, in this embodiment, a terminal device 5 (e.g., an electronic device) may include a processor 50, a storage 51, and a computer program 52 stored in the storage 51 and executable on the processor 50. When executing (instructions in) the computer program 52, the processor 50 implements the steps in the above-mentioned embodiments of the image quality assessing method, for example, steps S101-S104 shown in FIG. 1. Alternatively, when the processor 50 executes the (instructions in) computer program 52, the functions of each module/unit in the above-mentioned device embodiments, for example, the functions of the modules 401-404 shown in FIG. 4 are implemented.

Exemplarily, the computer program 52 may be divided into one or more modules/units, and the one or more modules/units are stored in the storage 51 and executed by the processor 50 to realize the present disclosure. The one or more modules/units may be a series of computer program instruction sections capable of performing a specific function, and the instruction sections are for describing the execution process of the computer program 52 in the terminal device 5.

The terminal device 5 may be a computing device such as a mobile phone, a tablet, a desktop computer, a notebook computer, a pocket computer, and a robot. The terminal device 5 may include, but is not limited to, the processor 50 and the storage 51. It can be understood by those skilled in the art that FIG. 5 is merely an example of the terminal device 5 and does not constitute a limitation on the terminal device 5, and may include more or fewer components than those shown in the figure, or a combination of some components or different components. For example, the terminal device 5 may further include an input/output device, a network access device, a bus, and the like.

The processor 50 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 51 may be an internal storage unit of the terminal device 5, for example, a hard disk or a memory of the terminal device 5. The storage 51 may also be an external storage device of the terminal device 5, for example, a plug-in hard disk, a smart media card (SMC), a secure digital (SD) card, flash card, and the like, which is equipped on the terminal device 5. Furthermore, the storage 51 may further include both an internal storage unit and an external storage device, of the terminal device 5. The storage 51 is configured to store the computer program 52 and other programs and data required by the terminal device 5. The storage 51 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A quality assessment method for a to-be-assessed original image, comprising:
   obtaining the to-be-assessed original image;
   obtaining a grayscale image and a histogram equalization image corresponding to the obtained original image by performing an image conversion on the original image;
   calculating an image similarity between the obtained grayscale image and the obtained histogram equalization image; and
   determining an image quality assessment result of the original image according to the calculated image similarity.

2. The method of claim 1, wherein obtaining the grayscale image and the histogram equalization image corresponding to the obtained original image by performing the image conversion on the original image comprises:

obtaining the grayscale image corresponding to the original image by performing a grayscale processing on the original image; and obtaining the histogram equalization image corresponding to the original image by performing a histogram equalization processing on the grayscale image.

3. The method of claim 1, wherein determining the image quality assessment result of the original image according to the calculated image similarity comprises:

calculating an image quality score of the original image according to the image similarity; and determining the image quality assessment result of the original image according to the image quality score.

4. The method of claim 3, wherein calculating the image quality score of the original image according to the image similarity comprises:

calculating a difference between a preset maximum similarity and the image similarity; and obtaining the image quality score of the original image by normalizing the difference to a preset image quality score interval.

5. The method of claim 3, wherein determining the image quality assessment result of the original image according to the image quality score comprises:

determining the original image to be a normal image, in response to the image quality score being larger than a preset image quality score threshold; and determining the original image to be a distorted image, in response to the image quality score being less than or equal to the image quality score threshold.

6. The method of claim 3, wherein determining the image quality assessment result of the original image according to the image quality score comprises:

determining a score level interval in which the image quality score is located; and determining an image quality level corresponding to the score level interval as the image quality level of the original image.

7. The method of claim 1, wherein determining the image quality assessment result of the original image according to the calculated image similarity comprises:

determining the original image to be a normal image, in response to the image similarity being less than a preset image similarity threshold; and determining the original image to be a distorted image, in response to the image similarity being larger than or equal to the image similarity threshold.

8. An electronic device, comprising:

a processor;

a memory coupled to the processor; and one or more computer programs stored in the memory and executable on the processor;

wherein, the one or more computer programs comprise:

instructions for obtaining a to-be-assessed original image;

instructions for obtaining a grayscale image and a histogram equalization image corresponding to the obtained original image by performing an image conversion on the original image;

instructions for calculating an image similarity between the obtained grayscale image and the obtained histogram equalization image; and instructions for determining an image quality assessment result of the original image according to the calculated image similarity.

9. The electronic device of claim 8, wherein the instructions for obtaining the grayscale image and the histogram equalization image corresponding to the obtained original image by performing the image conversion on the original image comprise:

instructions for obtaining the grayscale image corresponding to the original image by performing a grayscale processing on the original image; and instructions for obtaining the histogram equalization image corresponding to the original image by performing a histogram equalization processing on the grayscale image.

10. The electronic device of claim 8, wherein the instructions for determining the image quality assessment result of the original image according to the calculated image similarity comprise:

instructions for calculating an image quality score of the original image according to the image similarity; and instructions for determining the image quality assessment result of the original image according to the image quality score.

11. The electronic device of claim 10, wherein the instructions for calculating the image quality score of the original image according to the image similarity comprise:

instructions for calculating a difference between a preset maximum similarity and the image similarity; and instructions for obtaining the image quality score of the original image by normalizing the difference to a preset image quality score interval.

12. The electronic device of claim 10, wherein the instructions for determining the image quality assessment result of the original image according to the image quality score comprise:

instructions for determining the original image to be a normal image, in response to the image quality score being larger than a preset image quality score threshold; and instructions for determining the original image to be a distorted image, in response to the image quality score being less than or equal to the image quality score threshold.

13. The electronic device of claim 10, wherein the instructions for determining the image quality assessment result of the original image according to the image quality score comprise:

instructions for determining a score level interval in which the image quality score is located; and instructions for determining an image quality level corresponding to the score level interval as the image quality level of the original image.

14. The electronic device of claim 8, wherein the instructions for determining the image quality assessment result of the original image according to the calculated image similarity comprise:

instructions for determining the original image to be a normal image, in response to the image similarity being less than a preset image similarity threshold; and instructions for determining the original image to be a distorted image, in response to the image similarity being larger than or equal to the image similarity threshold.

15. A non-transitory computer-readable storage medium for storing one or more computer programs, wherein the one or more computer programs comprise:

instructions for obtaining a to-be-assessed original image;

instructions for obtaining a grayscale image and a histogram equalization image corresponding to the obtained original image by performing an image conversion on the original image;

instructions for calculating an image similarity between the obtained grayscale image and the obtained histogram equalization image; and instructions for determining an image quality assessment result of the original image according to the calculated image similarity.

16. The storage medium of claim 15, wherein the instructions for obtaining the grayscale image and the histogram equalization image corresponding to the obtained original image by performing the image conversion on the original image comprise:

instructions for obtaining the grayscale image corresponding to the original image by performing a grayscale processing on the original image; and instructions for obtaining the histogram equalization image corresponding to the original image by performing a histogram equalization processing on the grayscale image.

17. The storage medium of claim 15, wherein the instructions for determining the image quality assessment result of the original image according to the calculated image similarity comprise:

instructions for calculating an image quality score of the original image according to the image similarity; and instructions for determining the image quality assessment result of the original image according to the image quality score.

18. The storage medium of claim 17, wherein the instructions for calculating the image quality score of the original image according to the image similarity comprise:

instructions for calculating a difference between a preset maximum similarity and the image similarity; and instructions for obtaining the image quality score of the original image by normalizing the difference to a preset image quality score interval.

19. The storage medium of claim 17, wherein the instructions for determining the image quality assessment result of the original image according to the image quality score comprise:

instructions for determining the original image to be a normal image, in response to the image quality score being larger than a preset image quality score threshold; and instructions for determining the original image to be a distorted image, in response to the image quality score being less than or equal to the image quality score threshold.

20. The storage medium of claim 17, wherein the instructions for determining the image quality assessment result of the original image according to the image quality score comprise:

instructions for determining a score level interval in which the image quality score is located; and instructions for determining an image quality level corresponding to the score level interval as the image quality level of the original image.

* * * * *